United States Patent
Yue et al.

(10) Patent No.: US 10,645,387 B1
(45) Date of Patent: May 5, 2020

(54) PREDICTIVE QUANTIZATION CODING METHOD AND VIDEO COMPRESSION SYSTEM

(71) Applicant: Xi'an Creation Keji Co., Ltd., Xi'an (CN)

(72) Inventors: Qingdong Yue, Xi'an (CN); Wenfang Ran, Xi'an (CN); Wen Li, Xi'an (CN)

(73) Assignee: XI'AN CREATION KEJI CO., LTD., Xi'an (CN)

( * ) Notice: Subject to any disclaimer, the term of this patent is extended or adjusted under 35 U.S.C. 154(b) by 0 days.

(21) Appl. No.: 16/236,236

(22) Filed: Dec. 28, 2018

(30) Foreign Application Priority Data

Oct. 26, 2018 (CN) .......................... 2018 1 1260531

(51) Int. Cl.
| | |
|---|---|
| *H04N 19/124* | (2014.01) |
| *H04N 19/182* | (2014.01) |
| *H04N 19/126* | (2014.01) |
| *H04N 19/50* | (2014.01) |
| *H04N 19/186* | (2014.01) |
| *H04N 19/119* | (2014.01) |
| *H04N 19/105* | (2014.01) |

(52) U.S. Cl.
CPC ......... *H04N 19/126* (2014.11); *H04N 19/105* (2014.11); *H04N 19/119* (2014.11); *H04N 19/182* (2014.11); *H04N 19/186* (2014.11); *H04N 19/50* (2014.11)

(58) Field of Classification Search
CPC ... H04N 19/124; H04N 19/182; H04N 19/126
USPC .................................................... 375/240.02
See application file for complete search history.

(56) References Cited

U.S. PATENT DOCUMENTS

2017/0302920 A1* 10/2017 Pettersson ............ H04N 19/147

* cited by examiner

*Primary Examiner* — Jeffrey A Williams
(74) *Attorney, Agent, or Firm* — Hemisphere Law, PLLC; Zhigang Ma

(57) ABSTRACT

The present invention relates to a predictive quantization coding method and a video compression system. The method includes: dividing a pixel to be processed into a plurality of pixel components; obtaining one pixel component to be processed and texture direction gradients thereof; obtaining reference pixels and a prediction residual of the pixel component to be processed; forming a prediction residual code stream; dividing the prediction residual code stream into multiple quantization units; and obtaining a quantization residual code stream. The present invention can reduce the transmission bandwidth, and reduce the theoretical limit entropy and complexity.

10 Claims, 5 Drawing Sheets

PREDICTIVE QUANTIZATION CODING METHOD AND VIDEO COMPRESSION SYSTEM

BACKGROUND OF THE INVENTION

1. Field of the Invention

The present invention belongs to the technical field of compression coding technologies, and in particular to a predictive quantization coding method and a video compression system.

2. Description of Related Art

There is great redundancy in image data, decorrelation is generally performed by compression coding, that is, by less correlation between sequences, the video content is represented with a less number of bits, so as to reduce the redundancy in the video content. Therefore, the compression of videos or images is achieved.

In the compression coding process, the image coding is allowed to have certain distortions, which is also an important reason why the videos can be compressed. In many application occasions, it is not required that the compressed image is completely identical to the original image after restoration. Certain distortions are allowed since these distortions can utilize the visual characteristics of people to reduce the gray level of a quantized signal under the condition that the image change is not perceived, so as to increase a data compression ratio.

The predictive quantization coding method is a common method of compression coding. The existing predictive quantization coding method mainly has the following problems: the prediction pixel components are easily misjudged, which affects the prediction result, the correlation between pixel textures is not fully utilized, the theoretic limit entropy and computational complexity cannot be further reduced, and the data compression ratio and distortion loss after predictive quantization and compression cannot be further reduced.

Therefore, how to provide a predictive quantization coding method with high data compression ratio and small distortion loss is a hot topic of research.

SUMMARY OF THE INVENTION

Therefore, the present invention provides a predictive quantization coding method and a video compression system, which can effectively reduce the code stream transmission bandwidth, fully utilize the texture correlation for predictive coding, adaptively perform quantization coding, and further reduce the theoretical limit entropy and complexity.

A predictive quantization coding method, includes steps of: (a) dividing a pixel to be processed into a plurality of pixel components; (b) obtaining one pixel component to be processed from the plurality of pixel components; (c) obtaining texture direction gradients of the pixel component to be processed; (d) obtaining reference pixels according to the texture direction gradients and positional relationships between the pixel component to be processed and the remaining of the plurality of pixel components; (e) obtaining a prediction residual of the pixel component to be processed according to the reference pixels; (f) repeating steps (b) to (e), and taking each pixel component of the plurality of pixel components and obtaining the prediction residual corresponding thereto, to thereby form a prediction residual code stream; (g) dividing the prediction residual code stream into a plurality of quantization units; and (h) obtaining first rate distortion optimizations and second rate distortion optimizations corresponding to the plurality of quantization units to obtain a quantization residual code stream.

In an embodiment of the present invention, the step (a) of dividing the pixel to be processed into a plurality of pixel components includes: dividing the pixel to be processed into a R pixel component, a G pixel component, and a B pixel component.

In an embodiment of the present invention, the step (d) includes following substeps of: (d1) obtaining a first weighting gradient optimal value according to the texture direction gradients; (d2) obtaining a second weighting gradient optimal value according to the first weighting gradient optimal value and the positional relationships between the pixel component to be processed and the remaining of the plurality of pixel components; and (d3) obtaining the reference pixels according to the second weighting gradient optimal value.

In an embodiment of the present invention, the substep (d2) includes: (d21) obtaining positional relationship weights according to the positional relationships between the pixel component to be processed and the remaining of the plurality of pixel components; and (d22) obtaining the second weighting gradient optimal value according to the positional relationship weights and the first weighting gradient optimal value.

In an embodiment of the present invention, the positional relationships between the pixel components to be processed and the remaining of the plurality of pixel components satisfy that: the closer the pixel component to the pixel component to be processed is, the greater the positional relationship weight is, otherwise is smaller.

In an embodiment of the present invention, the step (h) includes substeps of: (h1) performing quantization processing on a prediction residual of each of the quantization units to obtain a quantization residual; (h2) sequentially performing a first inverse quantization processing and a first compensation processing on the quantization residual, to obtain a first inverse quantization residual and a first rate distortion optimization; (h3) performing a second compensation processing on the first inverse quantization residual, to obtain a second inverse quantization residual and a second rate distortion optimization; (h4) comparing the first rate distortion optimization and the second rate distortion optimization, setting a compensation flag bit to be no compensation if the first rate distortion optimization is less than the second rate distortion optimization; otherwise, setting the compensation flag bit to be compensation; and (h5) writing the compensation flag bit and the quantization residual into the quantization residual code stream.

In an embodiment of the present invention, the substep (h2) includes: (h21) sequentially performing the first inverse quantization processing and the first compensation processing on the quantization residual, to obtain the first inverse quantization residual; and (h22) obtaining the first rate distortion optimization according to the first inverse quantization residual, the prediction residual, and the quantization residual.

In an embodiment of the present invention, the substep (h3) includes: (h31) obtaining a fluctuation coefficient according to a first residual loss; (h32) performing the second compensation processing on the first inverse quantization residual according to the fluctuation coefficient and a fluctuation state, to obtain the second inverse quantization residual; and (h33) obtaining the second rate distortion optimization according to the second inverse quantization residual, the prediction residual, and the quantization residual.

In an embodiment of the present invention, the fluctuation coefficient k satisfies:

$$k = \text{round}\left(\sum_{i=0}^{i=pixnum_{none0}} \text{abs}(lossres_i)/pixnum_{none0}\right),$$

where $lossres_i$ is a value of an ith bit of the first residual loss, and pixnumnone0 is a number of non-zeros in the first residual loss.

The present invention further provides a video compression system including: a memory and at least one processor coupled to the memory. The at least one processor is configured to perform the predictive quantization coding method according to any one of the above embodiments.

The predictive quantization coding method and the video compression system of the present invention can effectively reduce the code stream transmission bandwidth, fully utilize the texture correlation for predictive coding, adaptively perform quantization coding, and further reduce the theoretical limit entropy and complexity.

DETAILED DESCRIPTION OF PREFERRED EMBODIMENTS

In the following, with reference to accompanying drawings of embodiments of the invention, technical solutions in the embodiments of the invention will be clearly and completely described. Apparently, the embodiments of the invention described below only are a part of embodiments of the invention, but not all embodiments. Based on the described embodiments of the invention, all other embodiments obtained by ordinary skill in the art without creative effort belong to the scope of protection of the invention.

Figure 1:
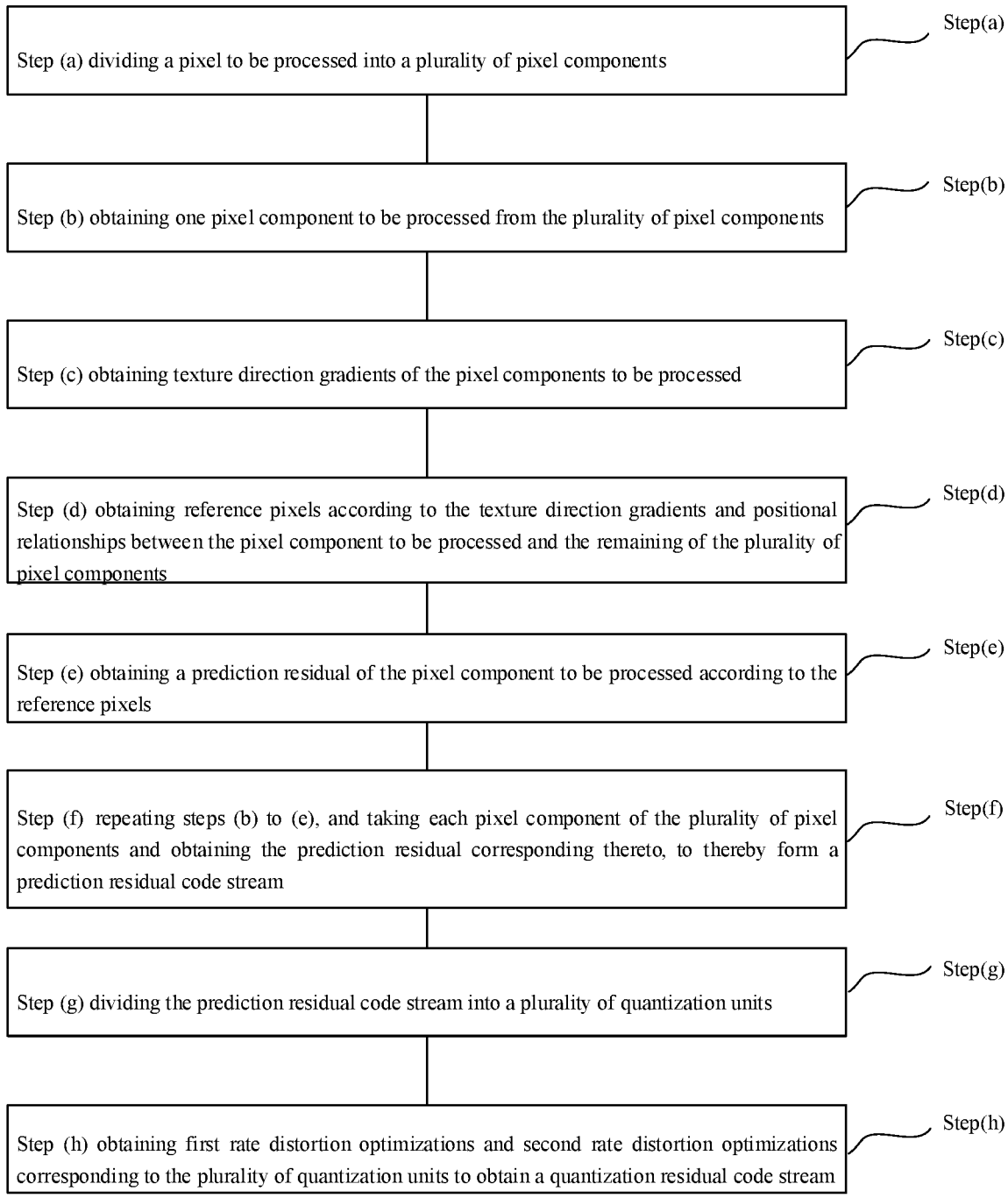
FIG. 1 is a schematic flowchart of a predictive quantization coding method according to an embodiment of the present invention.

Referring to FIG. 1, FIG. 1 is a schematic diagram of a predictive quantization coding method according to an embodiment of the present invention. The method may include the steps of: (a) dividing a pixel to be processed into a plurality of pixel components; (b) obtaining one pixel component to be processed from the plurality of pixel components; (c) obtaining texture direction gradients of the pixel component to be processed; (d) obtaining reference pixels according to the texture direction gradients and positional relationships between the pixel component to be processed and the remaining of the plurality of pixel components; (e) obtaining a prediction residual of the pixel component to be processed according to the reference pixels; (f) repeating steps (b) to (e), and taking each pixel component of the plurality of pixel components and obtaining the prediction residual corresponding thereto, to thereby form a prediction residual code stream; (g) dividing the prediction residual code stream into a plurality of quantization units; and (h) obtaining first rate distortion optimizations and second rate distortion optimizations corresponding to the quantization units to obtain a quantization residual code stream.

Figure 6:
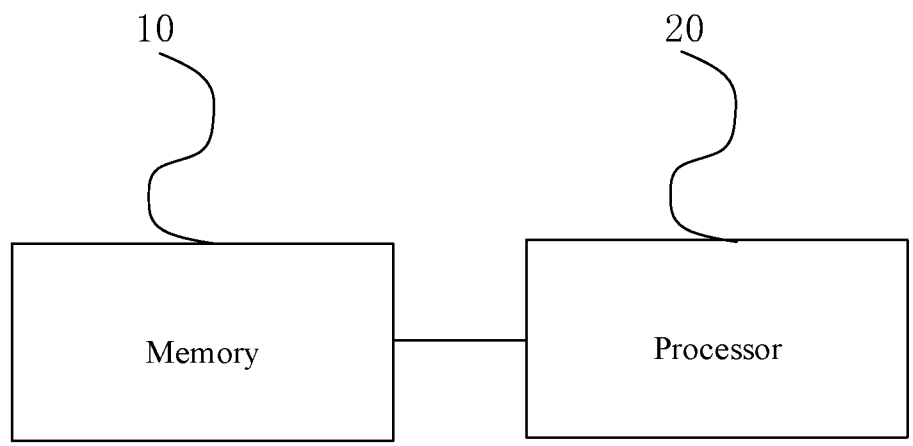
FIG. 6 is a schematic structural diagram of a video compression system according to an embodiment of the present invention.

It should be noted that the above various steps may be implemented by executing instructions stored in one or more memories 10 through one or more processors 20 (referring to FIG. 6).

The predictive quantization coding method of the present invention can effectively reduce the code stream transmission bandwidth, fully utilize the texture correlation for predictive coding, adaptively perform quantization coding, and further reduce the theoretical limit entropy and complexity.

The specific embodiments of the predictive quantization coding method will be described in detail emphatically below.

Embodiment 1

Figure 2:
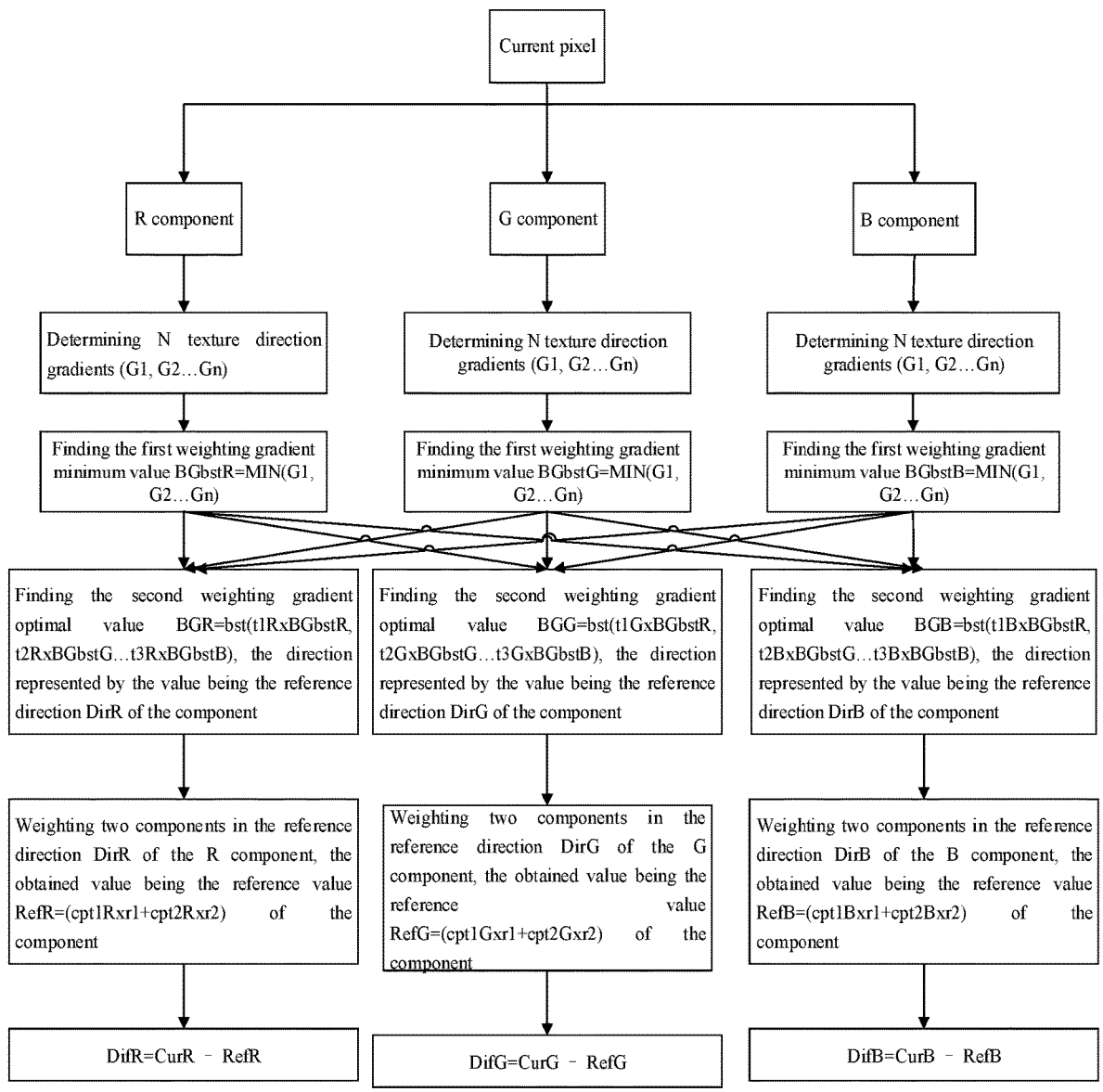
FIG. 2 is a schematic diagram of a principle of a predictive quantization coding method according to an embodiment of the present invention.

Referring to FIG. 2, FIG. 2 is a schematic diagram of a principle of a predictive quantization coding method according to an embodiment of the present invention. The present embodiment includes all content of embodiment 1 based on the above embodiment, and the predictive quantization coding method will be described in detail emphatically. Specifically, the predictive quantization coding method includes the following steps.

S01: any pixel of an image to be processed is obtained as the pixel to be processed. Specifically, the pixel can be obtained in sequence as the pixel to be processed according to the sequence of a pixel matrix of the image to be processed from left to right.

S02: the above pixel to be processed is divided into a R pixel component, a G pixel component and a B pixel component of the pixel to be processed. Correspondingly, any pixel in the pixel matrix of the image to be processed can be divided into the corresponding R pixel component, G pixel component and B pixel component.

The pixel to be processed may also be divided into RGBY four pixel components, or RGBW four pixel components, and the component dividing manner is not specifically limited.

S03: the pixel component to be processed is obtained.

Any pixel component of the pixel to be processed is used as the pixel component to be processed.

S04: texture direction gradients of the pixel component to be processed are obtained.

The texture direction gradients are vectors including two characteristics: the vector direction of the texture direction gradient and the size of the texture direction gradient.

The texture direction gradients are determined by pixel components around the pixel component to be processed, and for the surrounding components of the pixel component to be processed, N texture direction gradients G1 to GN of the pixel component to be processed are determined.

Figures 3, 4:
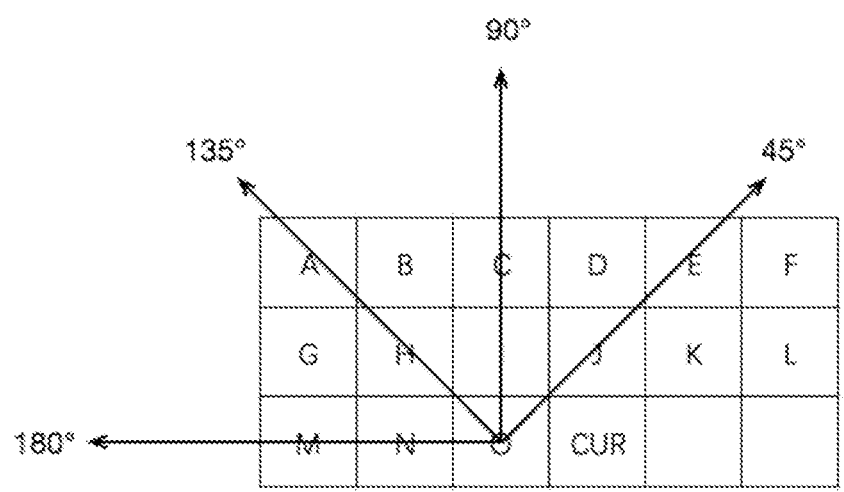
FIG. 3 is a schematic diagram of an R pixel component in a predictive quantization coding method according to an embodiment of the present invention.
FIG. 4 is a schematic diagram of a texture direction gradient calculation principle for a pixel component to be processed in a predictive quantization coding method according to an embodiment of the present invention.

Referring to FIG. 3 and FIG. 4, FIG. 3 is a schematic diagram of a R pixel component in a predictive quantization coding method according to an embodiment of the present invention. FIG. 4 is a schematic diagram of a texture direction gradient calculation principle for a pixel component to be processed in a predictive quantization coding method according to an embodiment of the present invention.

The R component of the pixel to be processed is obtained as the component CUR of the pixel to be processed, wherein CUR is the R component of the pixel to be processed, and A to O are the R components of the pixels that have been predicted and coded before the pixel to be processed.

Firstly, the O pixel component next to the component CUR of the pixel to be processed is found as the texture reference component.

One embodiment is that an N pixel component, an H pixel component, an I pixel component, and a J pixel component with a pixel distance of 0 around the O pixel component are obtained. A vector line from the O pixel component to the J pixel component, the I pixel component, the H pixel component and the N pixel component is formed respectively, then the vector line direction of the O pixel component to the J pixel component is taken as the vector direction of the first texture gradient, and the absolute value of the difference value between the J pixel component and the O pixel component is the size of the first texture gradient, thereby obtaining the first texture gradient (45°). Similarly, a second texture direction gradient (90°), a third texture direction gradient (135°) and a fourth texture direction gradient (180°) can be obtained according to the I pixel component, the H pixel component, and the N pixel component respectively.

Another embodiment is that the pixel components having a pixel distance of 1 around the O pixel component are an M pixel component, a G pixel component, an A pixel component, a B pixel component, a C pixel component, a D pixel component, an E pixel component and an F Pixel component respectively. Similarly, the corresponding eight texture direction gradients can also be obtained.

Similarly, N texture direction gradients corresponding to the G component and the B component of the pixel to be processed respectively can be respectively obtained.

S05: reference pixels are obtained according to the texture direction gradients and positional relationships between the pixel component to be processed and the remaining of the plurality of pixel components.

S051: obtaining a first weighting gradient optimal value according to the texture direction gradients.

The R component is taken as an example, the N texture direction gradients G1 to GN of the texture reference component of the pixel component to be processed are subjected to vector weighting to obtain a first weighting gradient BG of the N texture direction gradients after weighting. The weighting formula is as follows: BG=w1*G1+w2*G2+ . . . +wN*GN, wherein w1, w2 . . . wN are weighting coefficients, which may be the same or different, and w1, w2, . . . wN may be preset fixed values. Further, when the relative sizes of w1, w2, . . . , wN are configured, empirical values may be considered. For example, it has been known from past experience that the direction of the texture direction gradient G1 may be more suitable for the actual situation in which the image is predicted. Then a value more suitable for the actual situation in which the image is predicted may be configured for w1 (for example, the w may be configured to be very small), to increase the weighting in the direction of the texture direction gradient G1. Of course, w1, w2, . . . wN may also be adaptive, that is, the relative sizes of w1, w2, . . . , wN can be flexibly adjusted according to the actual situation of the early prediction processing, specifically w1+w2+ . . . +wN=1.

The values of a plurality of groups w1, w2, . . . , wN are selected to obtain a plurality of first weighting gradients. The first weighting gradient corresponding to the minimum value of the vector sizes in the plurality of first weighting gradients is taken as the first weighting gradient optimal value BGbstR of the R component of the pixel to be processed.

Similarly, the first weighting gradient optimal values BGbstG, BGbstB of the G component and the B component respectively of the pixel to be processed can be obtained.

S052: a second weighting gradient optimal value is obtained according to the first weighting gradient optimal values and the positional relationships between the pixel component to be processed and the remaining pixel components.

Vector addition is performed according to the first weighting gradient optimal values of the R component, the G component, and the B component obtained in step S051 to obtain the second weighting gradient optimal value of the R component of the pixel to be processed, and the following formula is satisfied, $BG^R = t1^R \times BGhst^R + t2^R \times BGbst^G + t3^R \times BGbst^B$, wherein $BG^R$ is the second weighting gradient optimal value of the R component of the pixel to be processed. $t1^R$, $t2^R$ and $t3^R$ are respectively the weighting coefficients of the first weighting gradient optimal values of the R component, G component and B component, and may be the same or different.

Preferably, the weighting coefficient of the first weighting gradient optimal value of the R component of the pixel to be processed is the largest, and the weighting coefficient values of the first weighting gradient optimal values of other components of which the distances from the R component of the pixel to be processed are gradually increased are gradually decreased. The sum of the weighting coefficient values of the first weighting gradient optimal values is 1, specifically $t1^R + t2^R + t3^R = 1$.

The distance from the R component of the pixel to be processed is determined according to the dividing order of the pixel component of the pixel to be processed. For example, the dividing order of the pixel components of the pixel to be processed is the R component, the G component, and the B component, and then the distance from the R component to the G component is less than the distance between the R component and the B component.

Similarly, the second weighting gradient optimal value $BG^G$ of the G component of the pixel to be processed and the second weighting gradient optimal value $BG^B$ of the B component of the pixel to be processed can be obtained.

Referring to FIG. 2 again, the second weighting gradient optimal values $BG^R$, $BG^G$ and $BG^B$ respectively satisfy: $BG^R = 0.5 \times BGbst^R + 0.3 \times BGbst^G + 0.2 \times BGbst^B$, $BG^G = 0.3 \times BGbst^R + 0.4 \times BGbst^G + 0.3 \times BGbst^B$, $BG^B = 0.2 \times BGbst^R + 0.3 \times BGbst^G + 0.5 \times BGbst^B$.

S053: a reference value is obtained according to the second weighting gradient optimal values.

The vector direction of the second weighting gradient optimal value $BG^R$ of the R component of the pixel to be processed obtained in step S052 is obtained as a reference direction.

With the R component of the pixel to be processed as a vector origin point, all available pixel components in the reference direction are the reference pixels. The reference pixel values are subjected to scalar weighting to obtain the reference value Ref, and the weighting formula is as follows: $Ref^R = r1 \times cpt1 + r2 \times cpt2 + \ldots + rN \times cptN$, wherein r1, r2, ... rN are weighting coefficients of the reference pixels, and may be the same or different. cpt1 to cptN are N available pixel component values in the reference direction of the R component.

Figure 5:
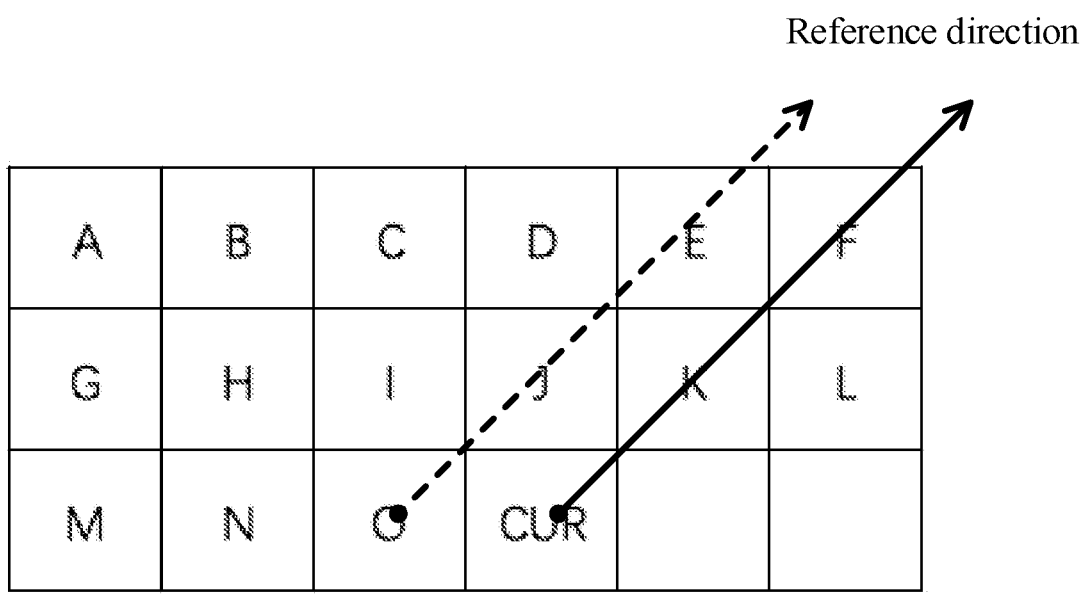
FIG. 5 is a schematic diagram of a reference direction calculation principle in a predictive quantization coding method according to an embodiment of the present disclosure.

Referring to FIG. 5. FIG. 5 is a schematic diagram of a reference direction calculation principle in a predictive quantization coding method according to an embodiment of the present invention.

BG, BGbst$^R$, BG$^R$ are vectors with the texture reference component O as the vector origin point. It is assumed that the vector direction of the second weighting gradient optimal value BG$^R$ is as shown in the figure, when the reference value Ref is calculated, the CUR of the pixel to be processed needs to be used as the vector origin point, the vector direction of BG$^R$ is taken as the reference direction, all available pixels in the reference direction, that is, the K pixel component and the F pixel component are obtained as the reference pixels, and weighting calculation is performed to obtain: $Ref^R = r1 \times cpt^K + r2 \times cpt^F$, wherein $cpt^K$ is the pixel component value of the R component of the pixel K to be processed, and $cpt^F$ is the pixel component value of the R component of the pixel F to be processed.

Preferably, for any component, if the reference is 45 degrees, then the reference value $Ref^R = 0.8 \times cpt^K + 0.2 \times cpt^F$.

If the reference is 135 degrees, then the reference value is 0.8*G+0.2 A. If the reference is 180 degrees, then the reference value is 0.8*K+0.2 J, the closer the pixel component value to the current pixel is, the larger the configuration coefficient is.

S06: a prediction residual of the pixel component to be processed is obtained according to the reference pixels.

By subtracting the reference value from the pixel value Cur$^R$ of the R component of the pixel to be processed, the prediction residual Dif$^R$ of the R component of the pixel to be processed can be obtained, and the calculation is as follows: $Dif^R = Cur^R - Ref^R$.

Similarly, the prediction residuals Dif$^G$ and Dif$^B$ of the G component and the B component can be obtained.

S07: steps (S03) to (S06) are repeated, and corresponding prediction residuals are obtained after taking each pixel component of the pixel to be processed as the pixel component to be processed, to thereby form a prediction residual code stream.

The obtaining process for the prediction residuals of the R component, the G component, and the B component in the above embodiment may be processed in parallel or in a serial manner, and may be set according to scenario needs, which is not excessively limited by the present embodiment.

S08: the prediction residual code stream is divided into a plurality of quantization units.

Preferably, the size of the quantization unit may be set to 8×1.

S09: a first rate distortion optimization and a second rate distortion optimization corresponding to each quantization unit are obtained to obtain a quantization residual code stream.

S091: a quantization processing is performed on a prediction residual of each of the quantization units to obtain a quantization residual.

The quantization parameter QP is firstly obtained, and all quantization units use the same quantization parameter. Preferably, the quantization parameter QP is 2.

The quantization unit is quantized by using the quantization parameter QP to obtain the first quantization residual, which satisfies: $QPRES_i = [PRES_i >> QP]$, wherein $QPRES_i$ is the quantization residual of the ith pixel of the quantization unit, $PRES_i$ is the prediction residual of the ith pixel of the quantization unit, and QP is the quantization parameter.

The ">>" formula indicates that if there is an expression a>>m, it means that the integer number a is shifted to the right by m bits according to the binary bits. After the shifting of the low bits, the high bits are complemented by 0.

S092: a first inverse quantization processing and a first compensation processing are sequentially performed on the quantization residual to obtain a first inverse quantization residual and a first rate distortion optimization.

S0921: firstly, the first inverse quantization processing and the first compensation processing are sequentially performed on the quantization residual to obtain the first inverse quantization residual.

The first inverse quantization processing is a process of performing inverse restoration on the quantization residual obtained in step S091. The first compensation processing is to compensate each bit of the quantization residual according to a preset compensation parameter, so as cause the inverse quantization residual subjected to inverse restoration to be closer to the original prediction residual.

$IQPRES\_1_i = QPRES_i << QP_i + CP_i$ is satisfied, wherein $IQPRES\_1_i$ is the first inverse quantization residual of the ith pixel of the quantization unit, and $CP_i$ is the compensation parameter of the first compensation processing of the ith pixel of the quantization unit.

Preferably, the first compensation parameter satisfies: $CP_i = (1 << QP_i)/2$

S0922: the first rate distortion optimization is obtained according to the first inverse quantization residual, the prediction residual, and the quantization residual.

A first residual loss is obtained based on the first inverse quantization residual and the prediction residual, $LOSS\_1_i = IQPRES\_1_i - PRES_i$ is satisfied, wherein $LOSS\_1_i$ is the first residual loss of the ith pixel of the quantization unit.

The first rate distortion optimization is calculated to satisfy:

$$RDO_1 = a1 \sum_{i=0}^{i=pixnum-1} abs(QPRES_i) + a2 \sum_{i=0}^{i=pixnum-1} LOSS\_1_i$$

wherein $RDO_1$ is the first rate distortion optimization, pixnum is the length of the quantization unit, and a1 and a2 are the weighting parameters.

Preferably, a1=a2=1.

S093: a second compensation processing is performed on the first inverse quantization residual to obtain a second inverse quantization residual and a second rate distortion optimization.

S0931: a fluctuation coefficient is obtained according to the first residual loss, wherein the fluctuation coefficient k satisfies:

$$k = round\left(\sum_{i=0}^{i=pixnum_{none0}} abs(lossres_i) / pixnum_{none0}\right);$$

where $LOSS\_1_i$ is the first residual loss of the ith bit pixel of the quantization unit, $pixnum_{none0}$ is the number of non-zeros in the first residual loss LOSS_1, and round represents a rounding operator.

S0932: the second compensation processing is performed on the first inverse quantization residual according to the fluctuation coefficient and a fluctuation state to obtain a second inverse quantization residual.

The second compensation processing is to perform second compensation on each bit of the first inverse quantization residual according to the fluctuation coefficient and the fluctuation state, so that the compensated inverse quantization residual is closer to the prediction residual.

The fluctuation state is obtained, wherein the fluctuation state is a sequence stored at a decoding end and a coding end simultaneously, satisfying: $CT=(c_0, c_1, c_i \ldots c_m)$, wherein $ci=0$ or 1 or −1, m=quantization unit length.

Preferably, the fixed fluctuation state can be set as: $CT=(1, 0, -1, 0, 1, 0, -1, 0)$.

The second compensation processing is performed on the first inverse quantization residual according to the fluctuation state and the fluctuation coefficient to calculate the second inverse quantization residual, which satisfies:

The second inverse quantization residual satisfies: $IQPRES\_2_i=IQPRES\_1_i+k\times c_i$, wherein $IQPRES\_2_i$ is the second inverse quantization residual of the ith pixel of the quantization unit, and $k\times c_i$ is the compensation coefficient of the second compensation processing.

S0933: the second rate distortion optimization, is obtained according to the second inverse quantization residual, the prediction residual, and the quantization residual.

A second residual loss is obtained according to the second inverse quantization residual and the prediction residual of the quantization unit, satisfying: $LOSS\_2=IQPRES\_2_i-PRES_i$, wherein $LOSS\_2_i$ is the second residual loss of the ith pixel of the quantization unit.

The second rate distortion optimization is calculated to satisfy:

$$RDO_2 = a1 \sum_{i=0}^{i=pixnum-1} abs(QPRES_i) + a2 \sum_{i=0}^{i=pixnum-1} LOSS\_2_i$$

wherein $RDO_1$ is the second rate distortion optimization.

S094: the first rate distortion optimization and the second rate distortion optimization are compared, if the first rate distortion optimization is less than the second rate distortion optimization, a compensation flag bit is set to be no compensation. Otherwise, the compensation flag bit is set to be compensation.

If the first rate distortion optimization is less than the second rate distortion optimization, it is indicated that the loss after the inverse quantization is smaller and the effect is better if the second compensation processing is not performed, and the compensation flag bit needs to be set to no compensation. Otherwise, it is indicated that the loss of the second compensation processing is smaller and the effect is better, and then the compensation flag bit needs to be set to compensation.

S095: the compensation flag bit and the quantization residual are written into the quantization residual code stream.

If the result of step S094 is no compensation, then the compensation flag bit and the quantization residual are written into the quantized residual code stream.

If the result of step S094 is compensation, then the compensation flag, the fluctuation coefficient, and the quantization residual are written into the quantization residual code stream. Herein, only the compensation flag bit and the quantization residual may be written into the quantization residual code stream, the fluctuation coefficient is calculated at the decoding end according to the calculation formula in the embodiment, and then the second compensation processing is performed.

Referring to FIG. 6, FIG. 6 is a schematic structural diagram of a video compression system according to an embodiment of the present invention. It should be noted that the above various steps may be implemented by executing instructions stored in one or more memories 10 through one or more processors 20.

The predictive quantization method and the video compression system according to the present invention can effectively reduce the code stream transmission bandwidth, fully utilize the texture correlation for predictive coding, adaptively perform quantization coding, and further reduce the theoretical limit entropy and complexity.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

INDUSTRIAL APPLICABILITY

The predictive quantization coding method according to the present invention can effectively reduce the code stream transmission bandwidth, fully utilize the texture correlation for predictive coding, adaptively perform quantization coding, and further reduce the theoretical limit entropy and complexity.

What is claimed is:

1. A predictive quantization coding method, comprising steps of:
   (a) dividing a pixel to be processed into a plurality of pixel components, wherein pixels of an image are sequentially taken as the pixel to be processed;
   (b) obtaining one pixel component to be processed from the plurality of pixel components;
   (c) obtaining texture direction gradients of the pixel component to be processed;
   (d) obtaining reference pixels according to the texture direction gradients and positional relationships between the pixel component to be processed and A remaining of the plurality of pixel components;
   (e) obtaining a prediction residual of the pixel component to be processed according to the reference pixels;
   (f) repeating steps (b) to (e), and taking each pixel component of the plurality of pixel components and obtaining the prediction residual corresponding thereto, and forming a prediction residual code stream including the prediction residuals of the pixel to be processed of the image;
   (g) dividing the prediction residual code stream into a plurality of quantization units each including a predetermined number of prediction residuals divided from the prediction residual code stream; and
   (h) obtaining first rate distortion optimizations and second rate distortion optimizations corresponding to the plurality of quantization units to obtain a quantization residual code stream.

2. The predictive quantization coding method according to claim 1, wherein the step (a) of dividing the pixel to be processed into a plurality of pixel components comprises: dividing the pixel to be processed into a R pixel component, a G pixel component, and a B pixel component.

3. The predictive quantization coding method according to claim 1, wherein the step (d) comprises following sub-steps of:
- (d1) obtaining a first weighting gradient optimal value according to the texture direction gradients;
- (d2) obtaining a second weighting gradient optimal value according to the first weighting gradient optimal value and the positional relationships between the pixel component to be processed and the remaining of the plurality of pixel components; and
- (d3) obtaining the reference pixels according to the second weighting gradient optimal value.

4. The predictive quantization coding method according to claim 1, wherein the sub-step (d2) comprises:
- (d21) obtaining positional relationship weights according to the positional relationships between the pixel component to be processed and the remaining of the plurality of pixel components; and
- (d22) obtaining the second weighting gradient optimal value according to the positional relationship weights and the first weighting gradient optimal value.

5. The predictive quantization coding method according to claim 1, wherein the positional relationships between the pixel components to be processed and the remaining of the plurality of pixel components satisfy that: the closer the pixel component to the pixel component to be processed is, the greater the positional relationship weight is, otherwise is smaller.

6. The predictive quantization coding method according to claim 1, wherein the step (h) comprises sub-steps of:
- (h1) performing quantization processing on a prediction residual of each of the quantization units to obtain a quantization residual;
- (h2) sequentially performing a first inverse quantization processing and a first compensation processing on the quantization residual, to obtain a first inverse quantization residual and a first rate distortion optimization;
- (h3) performing a second compensation processing on the first inverse quantization residual, to obtain a second inverse quantization residual and a second rate distortion optimization;
- (h4) comparing the first rate distortion optimization and the second rate distortion optimization, setting a compensation flag bit to be no compensation if the first rate distortion optimization is less than the second rate distortion optimization; otherwise, setting the compensation flag bit to be compensation; and
- (h5) writing the compensation flag bit and the quantization residual into the quantization residual code stream.

7. The predictive quantization coding method according to claim 6, wherein the sub-step (h2) comprises:
- (h21) sequentially performing the first inverse quantization processing and the first compensation processing on the quantization residual, to obtain the first inverse quantization residual; and
- (h22) obtaining the first rate distortion optimization according to the first inverse quantization residual, the prediction residuals, and the quantization residual.

8. The predictive quantization coding method according to claim 7, wherein the sub-step (h3) comprises:
- (h31) obtaining a fluctuation coefficient according to a first residual loss;
- (h32) performing the second compensation processing on the first inverse quantization residual according to the fluctuation coefficient and a fluctuation state, to obtain the second inverse quantization residual; and
- (h33) obtaining the second rate distortion optimization according to the second inverse quantization residual, the prediction residual, and the quantization residual.

9. The predictive quantization coding method according to claim 8, wherein the fluctuation coefficient k satisfies:

$$k = \text{round}\left(\sum_{i=0}^{i=pixnum_{none0}} \text{abs}(lossres_i) / pixnum_{none0}\right)$$

wherein, $lossres_i$ is a value of an ith bit of the first residual loss, and $pixnum_{none0}$ is a number of non-zeros in the first residual loss.

10. A video compression system, comprising: a memory and at least one processor coupled to the memory, wherein the at least one processor is configured to perform the predictive quantization coding method according to claim 1.

* * * * *